United States Patent
Higgins

(10) Patent No.: US 9,078,513 B2
(45) Date of Patent: Jul. 14, 2015

(54) BUFFING APPARATUS

(71) Applicant: Stephen Mark Higgins, Carrollton, TX (US)

(72) Inventor: Stephen Mark Higgins, Carrollton, TX (US)

(*) Notice: Subject to any disclaimer, the term of this patent is extended or adjusted under 35 U.S.C. 154(b) by 0 days.

(21) Appl. No.: 14/206,876

(22) Filed: Mar. 12, 2014

(65) Prior Publication Data
US 2014/0310897 A1    Oct. 23, 2014

Related U.S. Application Data

(60) Provisional application No. 61/779,911, filed on Mar. 13, 2013.

(51) Int. Cl.
| | |
|---|---|
| *B60S 3/04* | (2006.01) |
| *A46B 13/00* | (2006.01) |
| *B24D 13/12* | (2006.01) |
| *B24D 13/04* | (2006.01) |
| *B24D 13/20* | (2006.01) |

(52) U.S. Cl.
CPC .............. *A46B 13/00* (2013.01); *B24D 13/045* (2013.01); *B24D 13/12* (2013.01); *B24D 13/20* (2013.01); *B60S 3/048* (2013.01); *A46B 2200/3046* (2013.01)

(58) Field of Classification Search
CPC ................................ B60S 3/048; B24D 13/20
USPC .......... 15/97.1, 97.3, 230.14, 230.16, 230.17, 15/230.18, 230.19; 264/162; 451/527, 451/528, 536
See application file for complete search history.

(56) References Cited

U.S. PATENT DOCUMENTS

| | | | |
|---|---|---|---|
| 3,678,531 A * | 7/1972 | Hill .............................. | 15/230.19 |
| 5,187,827 A * | 2/1993 | Wei ................................. | 15/22.1 |
| 5,336,159 A * | 8/1994 | Cheng ............................. | 601/15 |
| 5,386,608 A * | 2/1995 | Montabaur et al. ............. | 15/179 |
| 5,634,693 A * | 6/1997 | Heuvelman ..................... | 300/21 |
| 7,203,989 B2 * | 4/2007 | McLain ........................ | 15/244.1 |
| 7,669,939 B2 * | 3/2010 | McLain .......................... | 300/21 |
| 8,029,070 B2 * | 10/2011 | McLain .......................... | 300/21 |
| 8,524,035 B2 * | 9/2013 | Eisenstock et al. ...... | 156/345.12 |
| 2008/0047085 A1 * | 2/2008 | Kolarevic et al. ............... | 15/179 |

* cited by examiner

*Primary Examiner* — Monica Carter
*Assistant Examiner* — Michael Jennings
(74) *Attorney, Agent, or Firm* — Jack D. Stone, Jr., Esq.; Scheef & Stone, L.L.P.

(57) ABSTRACT

A buffing apparatus has a shaft assembly connectable to a drill or other stationary motorized buffer/polisher. A stator is fixedly mounted on the shaft and a rotor is rotatably mounted on the shaft, and each of the stator and rotor includes a respective hub and two or more arms extending radially from the respective hub, and each of the two or more arms defines a hole. A pad having first and second holes is mounted on the shaft with an arm of the stator extending through a first hole of the pad and an arm of the rotor extending through a second hole of the pad. The pads are secured in place with a connector extending through the hole of an arm of the stator and through a hole of an arm of the rotor so that the pads are sandwiched between the shaft assembly and the connectors.

4 Claims, 3 Drawing Sheets

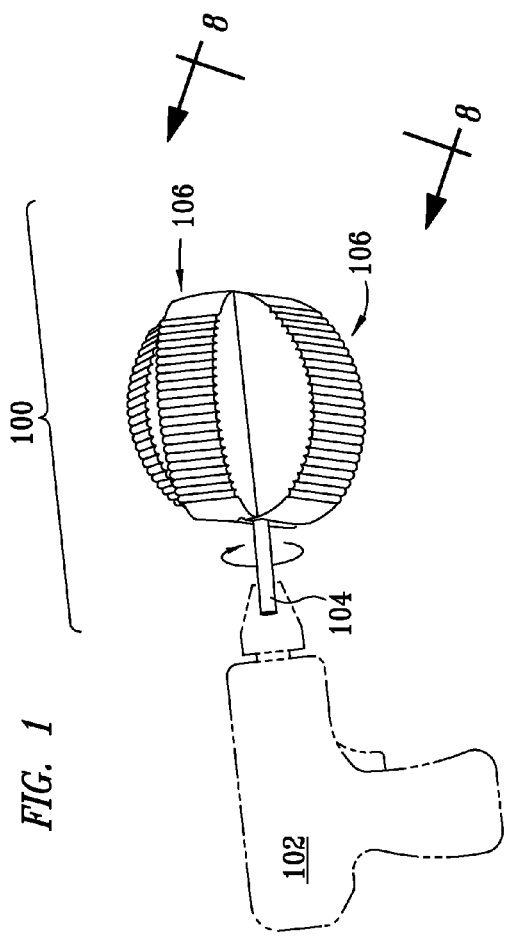
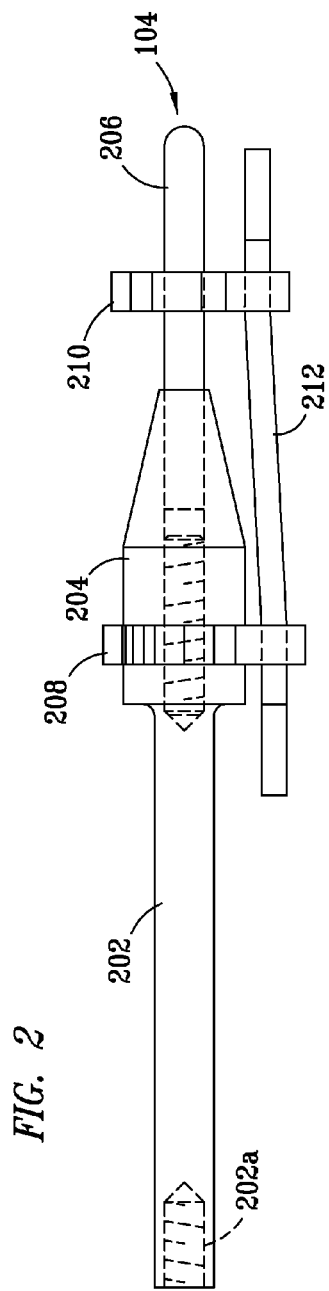
FIG. 1
FIG. 2

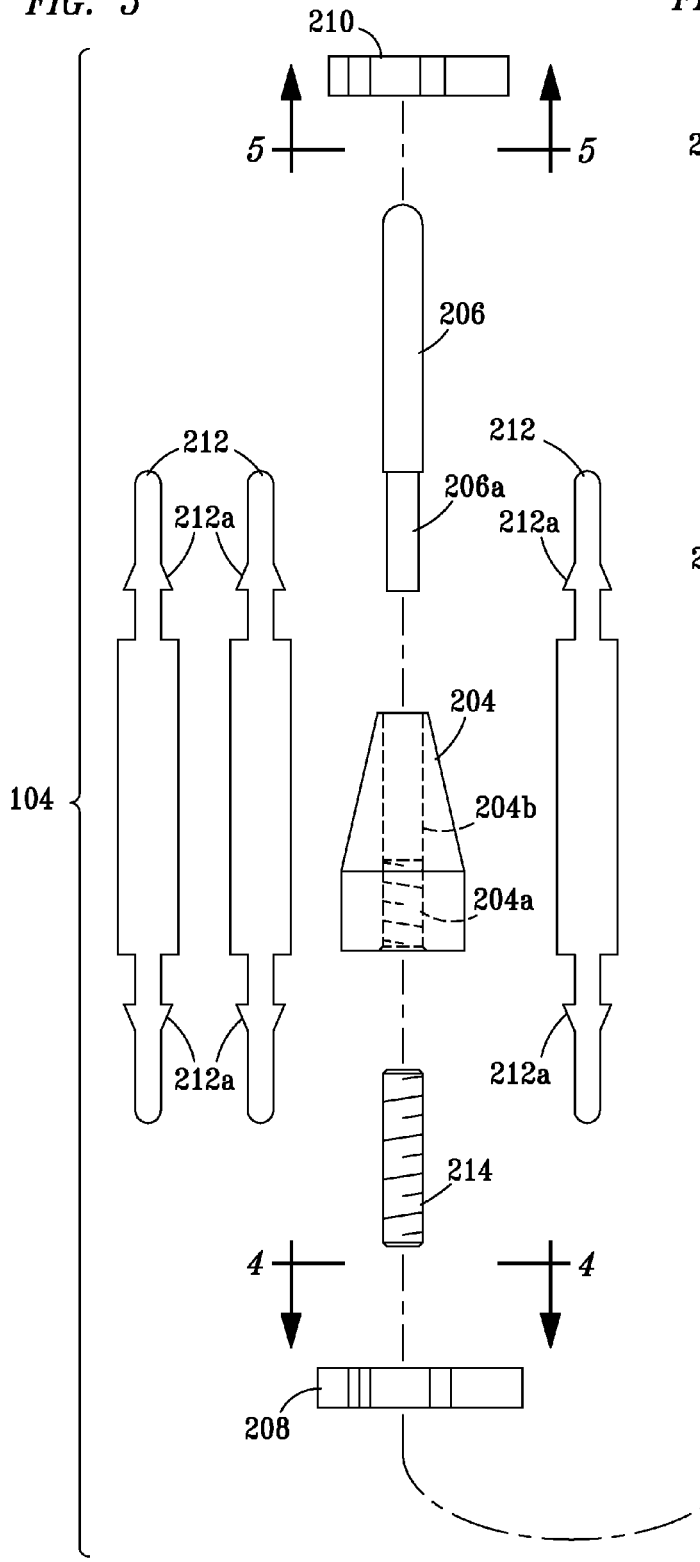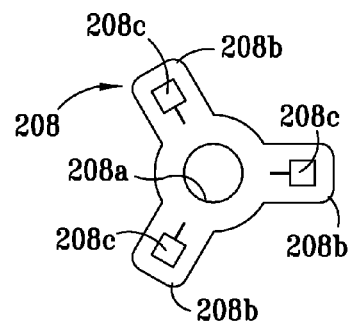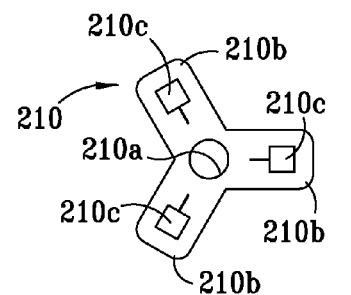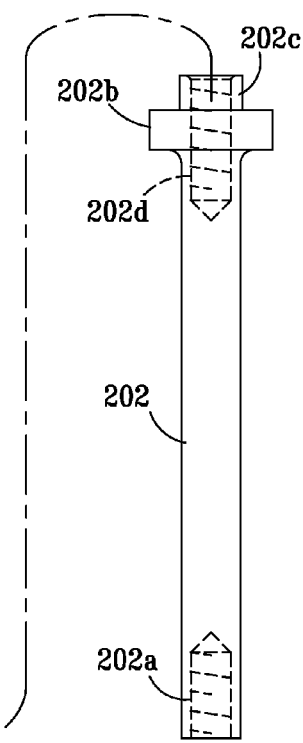

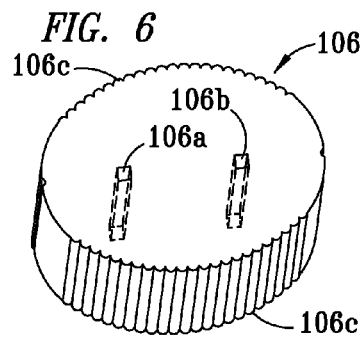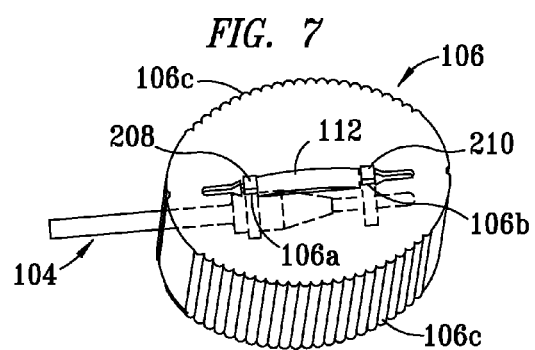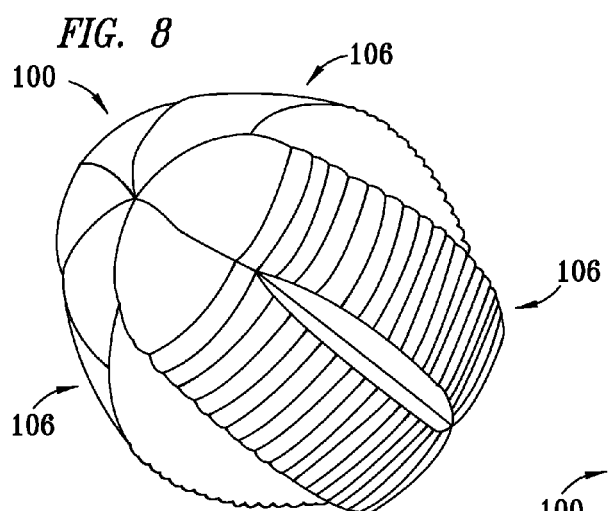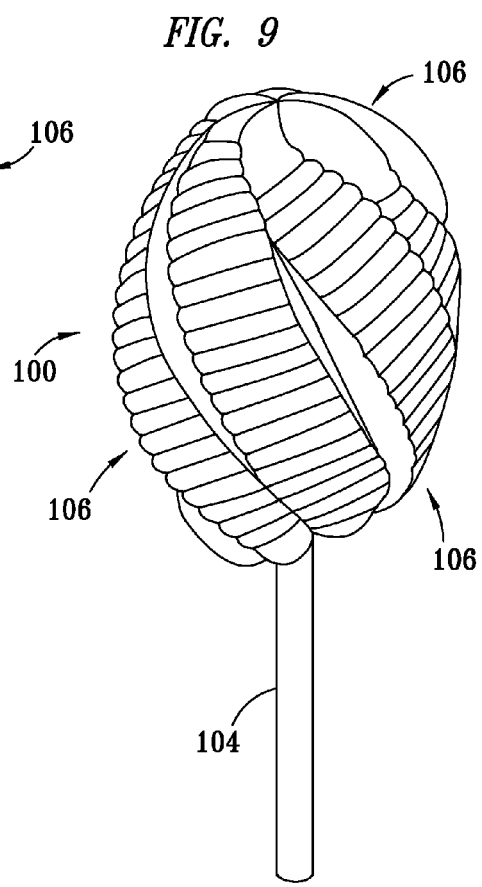

BUFFING APPARATUS

CROSS-REFERENCE TO RELATED APPLICATIONS

This application claims the benefit of U.S. Provisional Application No. 61/779,911, filed Mar. 13, 2013, which application is hereby incorporated herein by reference, in its entirety.

TECHNICAL FIELD

The invention relates generally to a buffer and, more particularly, to a modular buffing apparatus for buffing or polishing parts, such as wax or polishing compounds on automobiles.

BACKGROUND

When automobiles are waxed, they must be buffed. Conventional buffers, exemplified by the buffer of U.S. Pat. No. 7,203,989 to McLain, have a number of limitations. For example, they do not fit in small spaces, such as between spokes of automobile wheels. Further, when one component of such buffers breaks or wears out, the entire buffer must be replaced. Therefore, there is a need for a buffing apparatus that will fit in small spaces and, preferably, that allows for individual components to be replaced, thereby keeping maintenance costs down.

SUMMARY

The present invention provides a buffing apparatus which has a shaft assembly connectable to a drill or other stationary motorized buffer/polisher. A stator is fixedly mounted on the shaft, and includes a hub and two or more arms extending radially from the hub, and each of the two or more arms defines a hole. A rotor is rotatably mounted on the shaft, and includes a hub and two or more arms extending radially from the hub, and each of the two or more arms defines a hole. A pad having two holes is mounted on the shaft with an arm of the stator extending through a first hole of the pad, and an arm of the rotor extending through a second hole of the pad. The pads are secured in place with a connector extending through the hole of an arm of the stator and through a hole of an arm of the rotor, so that the pads are sandwiched between the shaft assembly and the connectors.

In operation, the shaft is connected to a drill or other stationary motorized buffer/polisher, and the buffing apparatus is rotated in either direction desired. If the apparatus is pushed into a tight space, the rotor rotates on the shaft and the pads torsionally compress to enable the apparatus to operate in a tight space.

The pads and components of the buffing apparatus are modular and may be readily replaced or exchanged.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 exemplifies a buffing apparatus embodying features of the present invention, wherein the apparatus is connected for operation to a drill or other stationary motorized buffer/polisher;

FIG. 2 exemplifies the buffing apparatus of the present invention without pads and only one connector;

FIG. 3 is an exploded view of the buffing apparatus of FIG. 2;

FIG. 4 exemplifies a stator of the present invention, viewed according to the line 4-4 of FIG. 3;

FIG. 5 exemplifies a rotor of the present invention, viewed according to the line 5-5 of FIG. 3;

FIG. 6 exemplifies a pad utilized in the buffing apparatus of FIG. 1;

FIG. 7 exemplifies one pad positioned on the shaft assembly;

FIG. 8 depicts an end view of the apparatus of FIG. 1, viewed according to the line 8-8 in FIG. 1; and FIG. 9 depicts how the pads of the invention may twist during use.

DETAILED DESCRIPTION

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as electric drills and the like necessary for the operation of the invention, have not been shown or discussed in detail inasmuch as such details are not considered necessary to obtain a complete understanding of the present invention, and are considered to be within the skills of persons of ordinary skill in the relevant art.

Referring to FIG. 1 of the drawings, the reference numeral 100 generally designates a modular buffing apparatus embodying features of the present invention coupled to an electric drill 102 for operating the apparatus. The system 100 includes a shaft assembly 104 connectable to the electric drill 102. Two or more buffer pads 106 are mounted to the shaft assembly, as discussed in further detail below.

FIG. 2 exemplifies the buffing apparatus 100 with the pads removed to more clearly depict the shaft assembly 104. Accordingly, the apparatus 100 includes a shaft 202 which optionally defines a threaded opening 202a at one end for adding a shaft extension. In one preferred embodiment, a conical extension 204 extends from the shaft 202, and a flexor 206 extends from the conical extension 204. A stator 208 is preferably mounted to the shaft 202 and secured thereto with the conical extension 204, as more fully discussed below with respect to FIG. 3. A rotor 210 is preferably rotatably mounted to the flexor 206. As discussed in further detail below, in a preferred embodiment, each of the stator 208 and rotor 210 include three arms, each of which arms define a hole through which a connector 212 extends. While only one connector 212 is depicted, it is understood that one connector would be provided for each arm of the stator or rotor; that is, three for the embodiment depicted herein. In a full assembly of the apparatus 100, a buffer pad 106 is sandwiched between the shaft 202 and each connector 212. The shaft 202, conical extension 204, stator 208, and rotor 210 are preferably fabricated from a metal, such as aluminum or steel, or a hard plastic. The flexor 206 is preferably fabricated from a relatively tough but flexible material, such as plastic or nylon, to allow for bending during the application of force into the buffing/polishing process (discussed below), allowing the buffing apparatus to better conform to the surface contours of the target material. The connectors 212 are preferably cut by waterjet or any suitable means, and preferably fabricated from a material, such as 90 shore A polyurethane X.12 thick, or comparable material.

FIG. 3 is an exploded view of the invention without the buffer pads 106. As shown, the shaft 202 defines a first threaded opening 202a at one end (the lower end as viewed in FIG. 3). The upper end of the shaft 202, as viewed in FIG. 3, includes a shoulder 202b and a neck 202c. A second threaded opening 202d is formed through the neck 202c into the shaft 202. In one preferred embodiment, the stator 208 is mounted via a hole 208a on the neck 202c, a threaded stud 214 is screwed into the hole 202d, and a threaded hole 204a defined in the conical extension 204 is screwed onto the stud 214 to secure the stator 208 in place. The flexor 206 defines an insertion portion 206a which is inserted into a hole 204b defined in the extension 204 and secured therein using any conventional technology, such as thermal shrink fit, threads, adhesive, or the like. The rotor 210 is rotatably mounted via a hole 210a to the flexor 206.

As shown most clearly in FIG. 4, the stator 208 includes a center hole 208a for mounting on the neck 202c, and three arms 208b. Each arm 208b defines a hole 208c. As shown most clearly in FIG. 5, the rotor 210 includes a center hole 210a for mounting on the flexor 206, and three arms 210b. Each arm 210b defines a hole 210c.

Referring back to FIG. 3, the three connectors 212 are depicted. One end of each connector 212 is inserted into a hole 208c of the stator 208, and the other end of the connector 212 is inserted into a hole 210c of the rotor 210. The connectors 212 are preferably configured with resistors 212a, as exemplified in FIG. 3, for resisting removal from the respective holes 208c and 210c during operation.

FIG. 6 depicts a buffer pad 106, including two holes 106a and 106b defined therein. The buffer pad 106 preferably defines a corrugated edge 106c to enhance buffing effectiveness. The buffer pad 106 may be cut by waterjet or any suitable means, and is preferably fabricated from a tough material, such as polyurethane foam, having a density of, for example, 1.7 to 2.3 pounds per cubic foot. More specifically, the pads are preferably fabricated from a polyester based, polyurethane foam, thermally reticulated with an entirely open and uniform cell structure. The pads are preferably fabricated with a roughness of 40 PPI for scouring a surface, or 80 PPI for polishing a surface. The pads 106 are also available in any number of different colors.

FIG. 7 illustrates how one buffer pad 106 is secured to the shaft assembly 100. The hole 106a is positioned over an arm 208b of the stator 208, and the second hole 106b is positioned over an arm 210b of the rotor 210. One end of a connector 212 is then inserted into a hole 208c of the stator and pulled through until the resistor 212a passes through the hole 208c. The other end of the connector 212 is then inserted into a hole 210c of the rotor and pulled through until the resistor 212a passes through the hole 210c. Referring to FIG. 2, the pad 106 would be sandwiched between the connector 212 on the one hand, and the shaft 202, extension 204, and flexor 206 on the other hand. The process of securing the buffer pad 106 is then repeated for the other pads, exemplified herein as two other pads, for a total of three pads. FIG. 8 exemplifies an end view, viewed according to line 8-8 in FIG. 1, of how the three buffer pads would appear when secured to the shaft assembly 102.

Referring back to FIG. 1, in operation, the shaft 202 of the buffing apparatus 100 is preferably attached to a conventional electric or pneumatic drill 102. The drill 102 is then turned on and, with the buffing apparatus spinning, applied to a surface in need of buffing or polishing, such as a wax surface of an automobile or a polishing compound on other surfaces. If the spinning buffing apparatus is inserted into a small space and meets with resistance to turning, such as between the spokes of an automobile wheel, then the rotor 210 will rotate relative to the stator 208, as depicted in FIG. 9, generating torsional compression to tighten up the pads to become smaller and fit in small spaces, one of the advantages of the present invention.

The pads 106 may also be readily removed by first removing the connectors 212 from the holes 208c and 210c, and then removing the pads from the arms 208b and 210b. By being able to attach and remove the pads 106, the pads may be readily replaced or exchanged without the need to replace or exchange the entire buffing apparatus 100, thereby saving on costs of the shaft assembly 104. For example, scouring pads 106 may be replaced by polishing pads, or worn pads may be replaced by new pads.

By use of the present invention, many advantages are obtained over the prior art. By way of example, as discussed above, pads 106 may be readily replaced or exchanged. Because pads are symmetrical, they have a longer life than conventional buffer pads. As discussed above, torsional compression enables the pads to fit in tight spaces. Because the pads extend beyond the flexor 206, the end of the apparatus is symmetrically padded. Rotation of the apparatus can be bi-directional.

It is understood that the present invention may take many forms and embodiments. Accordingly, several variations may be made in the foregoing without departing from the spirit or the scope of the invention. For example, the shaft assembly 104 could be configured in alternative ways. For example, the shaft 202 could extend as far as the flexor currently extends, thereby obviating the need for the conical extension 204 and flexor 206. The stator could be secured in position by use of a set screw, adhesive and/or the like. A different number of buffer pads 106 could be used; for example, two or four or more pads could be used. The pads 106 could be permanently attached to the shaft assembly 104 using attachment techniques, such as ultrasonic welding. The shaft assembly components could be simplified (e.g., shaft 202 and conical extension 204 could be fabricated as a single piece) and could be made using alternative techniques, such as injection molding.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:
1. A buffing apparatus comprising:
a shaft assembly connectable to at least one of a drill and a stationary buffer/polisher;
a stator fixedly mounted on the shaft, the stator including two or more stator arms extending radially from the shaft, each of the two or more stator arms defining a respective stator arm hole;
a rotor rotatably mounted on the shaft, the rotor including two or more rotor arms extending radially from the shaft, each of the two or more rotor arms defining a respective rotor arm hole;
two or more pads, each of which two or more pads defines a stator pad hole through which a respective one of the two or more stator arms extends, and a rotor pad hole through which a respective one of the two or more rotor arms extends; and
two or more connectors, each of which two or more connectors includes a respective stator end which extends through a respective stator arm hole, and a respective rotor end which extends through a respective rotor arm hole, such that each of the two or more pads are sandwiched between the shaft assembly and a respective one of the two or more connectors.

2. The apparatus of claim 1, wherein the two or more pads are fabricated from polyurethane foam.

3. The apparatus of claim 1, wherein the two or more pads are fabricated from polyurethane foam having a density of 1.7 to 2.3 pounds per cubic foot.

4. The apparatus of claim 1, further comprising a flexor extending axially from the shaft assembly, wherein the rotor is mounted on the flexor.

* * * * *